(12) United States Patent
Hummel (10) Patent No.: US 11,962,625 B2
(45) Date of Patent: Apr. 16, 2024

(54) SYSTEM AND METHOD FOR REMOTE STORAGE DEVICE SCANNING FOR DETECTING RESTRICTED CONTENT THEREIN

(71) Applicant: Steve Hummel, Fremont, CA (US)

(72) Inventor: Steve Hummel, Fremont, CA (US)

( * ) Notice: Subject to any disclaimer, the term of this patent is extended or adjusted under 35 U.S.C. 154(b) by 386 days.

(21) Appl. No.: 16/700,908

(22) Filed: Dec. 2, 2019

(65) Prior Publication Data

US 2020/0177640 A1 Jun. 4, 2020

Related U.S. Application Data

(60) Provisional application No. 62/773,252, filed on Nov. 30, 2018.

(51) Int. Cl.
*H04L 9/40* (2022.01)
*G06F 16/953* (2019.01)

(52) U.S. Cl.
CPC ............ *H04L 63/30* (2013.01); *G06F 16/953* (2019.01)

(58) Field of Classification Search
None
See application file for complete search history.

(56) References Cited

U.S. PATENT DOCUMENTS

| 9,015,212 B2 * | 4/2015 | David ................. G06F 3/0644 709/224 |
| 10,210,252 B2 * | 2/2019 | Pereira ................. G06T 7/162 |
| 2014/0206337 A1 | 7/2014 | Yach et al. |
| 2014/0208340 A1 | 7/2014 | Poornachandran et al. |
| 2014/0310825 A1 * | 10/2014 | Raichelgauz ......... G06F 16/957 726/30 |
| 2015/0143466 A1 * | 5/2015 | Zacher ................. H04L 63/10 726/4 |

(Continued)

FOREIGN PATENT DOCUMENTS

| KR | 1020100124951 | 11/2010 |
| KR | 1020170012442 | 2/2017 |

OTHER PUBLICATIONS

Luis Pineda-Morales et al., "Towards Multi-site Metadata Management for Geographically Distributed Cloud Workflows", Clusters 2015—IEEE Internaional Conference on Cluster Computing, Sep. 2015, Chicago, United States. 10.1109/Clusteer.2015.49. hal-01239150.

*Primary Examiner* — Kevin T Bates
*Assistant Examiner* — Emad Siddiqi (57) ABSTRACT

Embodiments of the present invention provide a method and apparatus for remotely accessing a computer system or network to identify storage devices and to retrieve metadata from the storage devices that are respectively unique to files stored in the storage devices. The metadata provides information regarding each file stored on the storage devices and each metadata is associated with a respective file. A scanning tool compares the metadata retrieved from the computer system or network to a database or list of known metadata of known restricted content. Metadata retrieved from the computer system or network that matches metadata from the database or list of known restricted content is flagged and the file associated with the matching metadata is flagged and reported as potentially storing restricted content. During the scanning, restricted content itself is not scanned, not copied, not transferred and not stored.

17 Claims, 5 Drawing Sheets

(56) References Cited

U.S. PATENT DOCUMENTS

2017/0264640 A1\* 9/2017 Narayanaswamy ......................... H04L 63/0281
2018/0246486 A1\* 8/2018 Krasadakis ......... G06F 21/6245
2019/0199740 A1\* 6/2019 Zhang ..................... G06F 21/53

\* cited by examiner

SYSTEM AND METHOD FOR REMOTE STORAGE DEVICE SCANNING FOR DETECTING RESTRICTED CONTENT THEREIN

CROSS-REFERENCE TO RELATED APPLICATIONS

This application claims the benefit of and priority to provisional patent application Ser. No. 62/773,252, with a filing date of Nov. 30, 2018, which is hereby incorporated by reference in its entirety.

FIELD

Embodiments of the present invention generally relate to the field of computer forensics. More specifically, embodiments of the present invention relate to stored information scanning techniques for detecting restricted content therein.

BACKGROUND

Finding illegal, inappropriate or otherwise "restricted" content on a computer network is a difficult and time consuming task. Today, such content is typically discovered on a single computer, accidentally, by another user or someone inadvertently seeing something on a display. Software programs that analyze stored data use algorithms for color tone, object orientation and shape recognition to discover restricted content. This software can be used to also report such content, but typically produces thousands of false positives in the process. The time required to verify the discovered content is prohibitive on a single computer and impractical on an entire network of computer systems.

Once discovered, a single image can trigger a forensic review of the entire specific hard drive. This is accomplished by physically removing the drive from the computer, connecting it to a forensic computer system with a write blocker to prevent changing or saving any data on the target drive and using a variety of forensic software tools to review the data. This must be done in person since reviewing, transmitting, coping or storing illegal content over the Internet is a federal crime.

Therefore, existing computer forensic approaches used to identify restricted content (that may include illegal content or content inappropriate for a school or business) typically involve physically removing computer hard drives or storage systems to perform a full scan of the files stored therein. However, as stated above, it is an extremely time consuming or otherwise difficult or impossible task to gain physical access to the hard drive, and scanning all of the content of the hard drive can include vast amounts of data that cannot be scanned in a reasonable period of time. Moreover, and importantly, this approach is impractical for scanning an entire computer network that may include hundreds or thousands of hard drives, as one would find in a school or enterprise network.

Therefore, what is needed is a lawful and efficient approach to identifying restricted content in a computer network remotely, that does not require physically removing or handling the hard drives or storage systems, and that does not require an analysis based opinion of every file on the entire hard drive, and that does not yield many false positives.

SUMMARY

Accordingly, embodiments of the present invention provide a method and system for remotely accessing a computer system or network to identify storage devices therein and to remotely retrieve metadata from the storage devices. The metadata provides information regarding each file stored on the storage devices. In one embodiment, the metadata is a digest or signature or hash value of an associated file. A scanning tool automatically compares the metadata retrieved from the computer system or network to a database or list of metadata of known restricted content. Metadata retrieved from the computer system or network that matches metadata (e.g., a hash value) from the database or list of known restricted content is flagged, and the file path of the file associated with the metadata is marked and reported.

Since only the metadata is scanned, and not the file data itself, scanning can be accomplished in a reasonable amount of time. Further, since the metadata is not image data, it can be legally copied and transmitted. Moreover, since the metadata is compared against known restricted metadata, matches thereof result in significantly fewer false positives.

According to one embodiment, a method of identifying restricted content on a computer system is disclosed. The method includes accessing a remote computer network, identifying a storage device of the remote computer network, retrieving metadata from the storage device of the remote computer network, where the metadata includes metadata entries that describe files stored on the storage device, retrieving metadata associated with known restricted content from one or more remote databases, comparing the metadata entries to the metadata associated with known restricted content, and flagging a respective metadata entry and file path associated therewith that matches the metadata associated with known restricted content.

According to some embodiments, the method includes identifying a network location, e.g., file path, associated with the respective metadata entry that matches the metadata associated with known restricted content.

According to some embodiments, the method includes identifying a user account associated with the respective metadata entry that matches the metadata associated with known restricted content.

According to some embodiments, the method includes identifying a computer system associated with the respective metadata entry that matches the metadata associated with known restricted content.

According to some embodiments, the metadata includes an MD5, SHA or other checksum hash.

According to some embodiments, the method includes identifying computer systems of the remote computer network that are powered off.

According to some embodiments, the method includes identifying files of the storage devices that are inaccessible.

According to some embodiments, retrieving metadata from the storage devices of the remote computer network includes identifying only these files that have been added or modified since a last previous scan was performed.

According to some embodiments, retrieving metadata from the storage devices of the remote computer network includes retrieving only metadata from the storage devices for the files that have been added or modified since the last previous scan.

According to some embodiments, the method includes flagging a respective metadata entry that represents a duplicate of a sensitive file.

According to another embodiment, a computer system for identifying restricted content on a remote computer system is disclosed. The computer system includes a memory for storing a list of known bad content, the list including metadata that identifies the known bad content and a processor that executes instructions of a method to identifying restricted content. The method includes identifying a storage device of the remote computer system, retrieving metadata from the storage device of the remote computer system, where the metadata includes metadata entries that describe files stored on the storage device, retrieving the metadata that identifies the known restricted content from the memory, comparing the metadata entries to the metadata that identifies the known restricted content, and flagging a respective metadata entry that matches the metadata that identifies the known restricted content, and recording a filepath of the file that matched. As used herein, the term "match" can refer to an exact match or a match according to a statistical matching algorithm that may not be considered an exact match. For example, according to some embodiments, a scan can be performed in two phases. In the first phase, only exact matches are identified. In the second phase, statistical matches are identified according to a statistical matching algorithm, and the second phase may contain more false positives than the first phase. The statistical matching phase is important for identifying metadata that has been modified slightly compared to the metadata associated with known restricted content.

According to a different embodiment, a non-transitory computer-readable storage medium having embedded therein program instructions, which when executed by one or more processors of a device, causes the device to execute a process that identifies restricted content on a remote computer system. The process includes accessing a remote computer network, identifying a storage device of the remote computer network, retrieving metadata from the storage device of the remote computer network, where the metadata includes metadata entries that describe files stored on the storage device, retrieving metadata associated with known restricted content from a remote database, comparing the metadata entries to the metadata associated with known restricted content, and flagging a respective metadata entry that matches the metadata associated with known restricted content.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a computer implemented method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," "scanning," "detecting," "reporting," "comparing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

System and Method for Remote Storage Device Scanning for Detecting Restricted Content Therein Embodiments of the present invention provide a method and system for remotely accessing a computer system or network to identify storage devices and to retrieve metadata from the storage devices. Each file stored in the computer system or network contains an associated unique metadata. That is, the metadata or "digest" value provides information regarding each file stored on the storage devices, and is generally a unique signature obtained from performing a digest function, e.g., hash function, on the file. The metadata is typically generated automatically by an operating system whenever a file is created or modified and then stored associated with the file. A scanning tool searches for this metadata and compares the metadata retrieved from the computer system or network to a metadata database or list of known restricted content. The metadata database contains the metadata of the known restricted content, not the restricted content itself. Metadata retrieved from the computer system or network that matches metadata from the database or list of known restricted content is flagged and reported as an output of the scanning tool.

Figure 1:
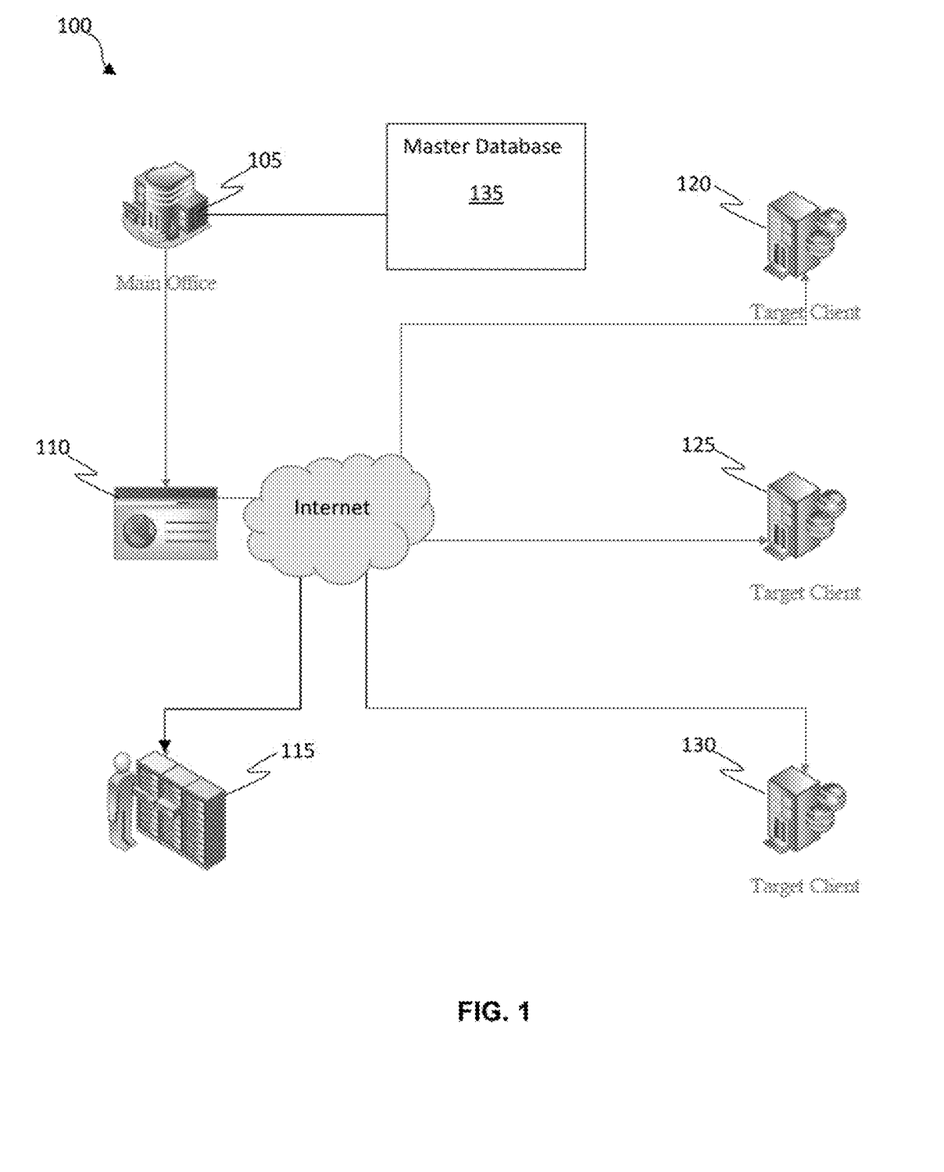
FIG. 1 depicts an exemplary computing environment for performing remote file scanning to detect restricted content based on metadata obtained from a remote computer system or network according to embodiments of the present invention.

As depicted in FIG. 1, an exemplary computing environment 100 is depicted according to embodiments of the present invention for remotely scanning a file system for restricted content (e.g., illegal, confidential, inappropriate, intellectual property, etc., content) which can include, for instance, any content but specifically may include images, e.g., bitmapped files (e.g., JPEG, MPEG, etc.). A local computer system 105 at a main office or location provides a scanning application 110 for remotely scanning file systems hosted by remote computer systems or networks. The scanning application 110 can be executed and/or managed by the local computer system 105, and the scanning application 110 can access a database 115 that stores information (e.g. metadata) associated with known restricted content. The database 115 contains metadata of known restricted content, but does not include the restricted content itself. The scanning application 110 can access the database 115 to retrieve/stream content of the database as needed (e.g., over the Internet), or the application can retrieve some or all of the database content and store the database content locally at computer system 105 in a local file system that is accessible to the scanning application 110.

The scanning application 110 can access target client computers 120, 125, and 130, for example, by remotely accessing the target client computers 120, 125, and 130 using administrative or superuser privileges over a virtual private network (VPN) connection or tunnel, or other encrypted Internet link. Generally, the scanning application 110 has authorization (typically by administration permission) to access the data of the target client computers 120, 125 and 130. The target client computers 120, 125, and 130 can comprise computer networks hosting multiple computer systems, and each computer system can have its own local file system that stores files and metadata associated with the files. The metadata includes information associated with a respective file such as the date the file was created, the file size, a user account associated with the file, the file path, etc. Importantly, the metadata also includes a hash or digest value or signature value (e.g., an MD5, SHA, RipeMD, Tiger, xxhash, CRC32, or any well-known digest or hash function) computed using well-known algorithms to uniquely provide a signature for the file. The multiple computer systems can also store data in a shared network storage device or cloud storage platform, for example. The scanning application 110 retrieves metadata associated with files stored by the computer systems of the target client computers 120, 125, and 130 and transfers and stores the metadata locally at local computer system 105. The scanning tool does not retrieve the actual files (e.g., images, movies, data, etc.) stored on the target client computers 120, 125, and 130. It is appreciated that the scanning tool can be a web-based application that is accessible over the Internet to gather metadata from the remote networks and to identify known restricted content via the metadata. Further, the hash or digest or signature value (metadata) can be used to identify the content of the associated file without directly scanning or copying or transferring the content of the file, which can be illegal for certain restricted content. After the metadata associated with files stored in a target client computer system or network has been retrieved and stored locally at local computer system 105, the scanning application 110 scans the metadata to identify known restricted content by comparing the metadata associated with the files to the known metadata stored locally in a master database 135 or in remote database 115. As stated above, the metadata can be retrieved from the target client computer system or network over the Internet, for example. Specifically, according to embodiments of the present invention, the scanning application 110 attempts to identify a hash value stored in metadata associated with a respective file retrieved form a target client computer system that matches a known hash value stored locally in master database 135 or in remote database 115. The hash value can be an MD5 hash (e.g., a 128-bit hash value), for instance, that uniquely correlates to or identifies a respective file. When an MD5 hash associated with a file matches a known MD5 hash stored locally in master database 135 or in remote database 115, the file associated with the MD5 hash that is stored on the target client computer system is flagged as containing restricted content and its filepath is logged and reported. In this way, restricted content can be efficiently identified with very few false positives using a remote scan approach and based on metadata associated with the files without having to retrieve the entire content of the file system or physically access the hard drive. Further, the actual content (e.g., images) of the files of the target drives are not scanned, not copied and not transferred, which could be illegal depending on the restricted content involved.

Figure 2:
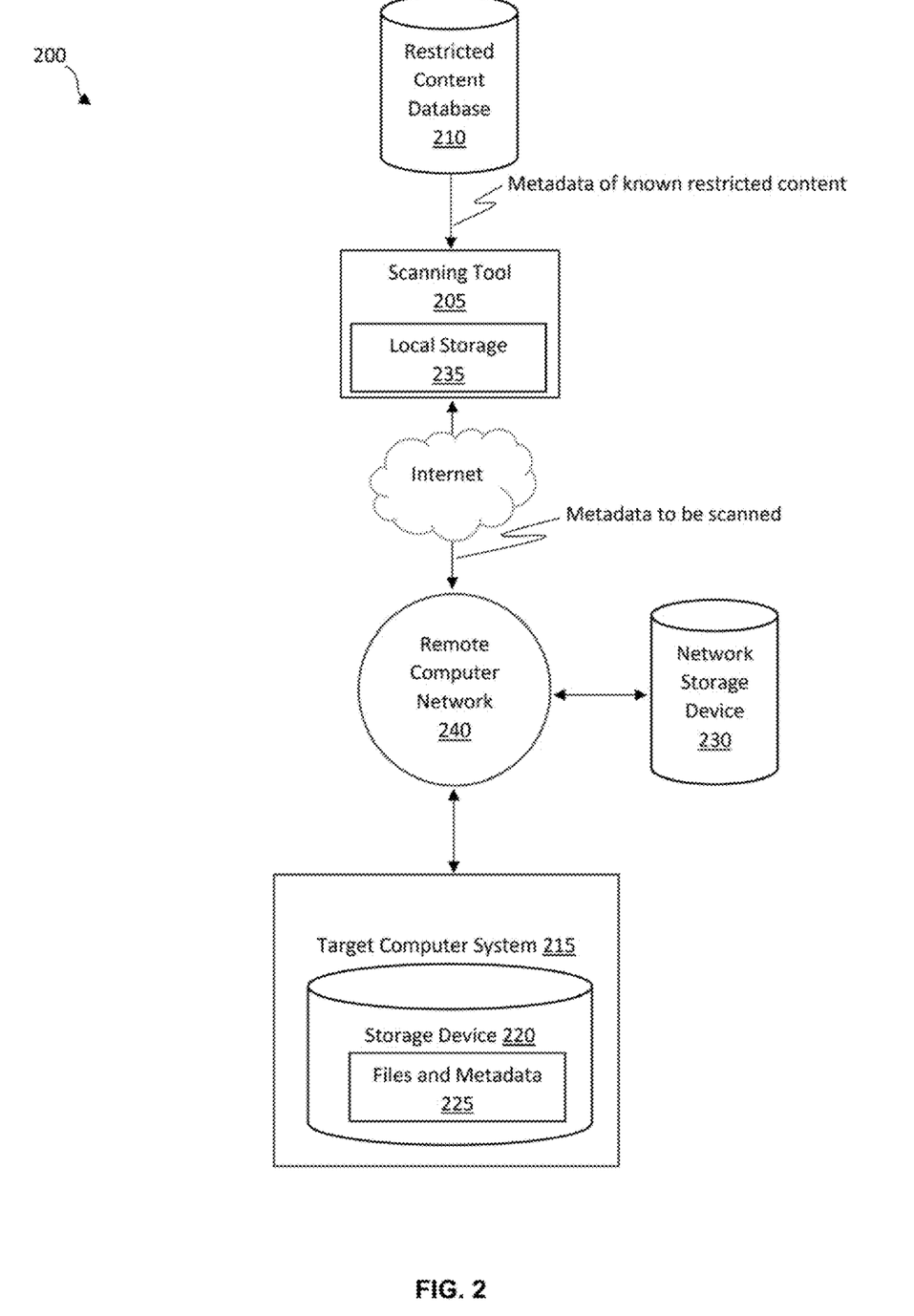
FIG. 2 depicts an exemplary block diagram and data flow diagram of a system for performing remote file scanning over a remote computer network to detect restricted content on a target computer system and network or cloud storage device according to embodiments of the present invention.

With regard to FIG. 2, an exemplary bock diagram and data flow diagram 200 of a system for remotely scanning metadata content of a computer system or computer network for known restricted content is depicted according to embodiments of the present invention. A scanning tool 205 is executed to access a remote computer network 240. According to some embodiments, the scanning tool 205 accesses the remote computer network 240 using administrative or superuser privileges over an encrypted link such as a VPN. It is assumed that the scanning tool 205 has permission, e.g., authorization, to perform such a scan.

Once the scanning tool 205 has access to the remote computer network 240, the scanning tool 205 can perform a device discovery process to identify each device of the remote computer network 240 that stores data. For example, the scanning tool 205 can identify local storage device 220 of target computer system 215 and network or cloud storage device 230. The scanning tool 205 can read metadata from local storage device 220 of target computer system 215 and network or cloud storage device 230 over the Internet, for example, and optionally write the metadata to local data storage 235, where the metadata describes the files stored on the local storage device 220 and the network or cloud storage device 230.

The scanning tool 205 can access one or more databases 210 that contain information (e.g., metadata) regarding known restricted content to obtain therefrom metadata that identifies known restricted content. For example, scanning tool 205 can access database 210 to retrieve a list of MD5 hash values (for example) associated with known restricted content. Any well known hash algorithm, digest algorithm or signature algorithm can be used and discussion of the MD5 hash value is merely exemplary. The known restricted content can include any restricted content and among other things, may include illegal content such as child pornography, child abuse, animal cruelty or abuse, unauthorized content, pirated content, confidential or any other sensitive information or intellectual property, etc. The metadata databases can be managed by third parties that may include law enforcement agencies or other governmental or private enterprises. The retrieved MD5 hash values from the database 210 are compared to MD5 hash values of the metadata obtained from the remote computer network 240. When an MD5 hash value associated with a file matches a known MD5 hash retrieved from database 210, the file associated with the MD5 hash that is stored by the target computer system 215 is flagged as containing restricted content and its file path is reported. In this way, restricted content can be efficiently identified remotely based on metadata associated with target files without having to retrieve the entire content of the file system or physically handle and remove the hard drive.

Figure 3:
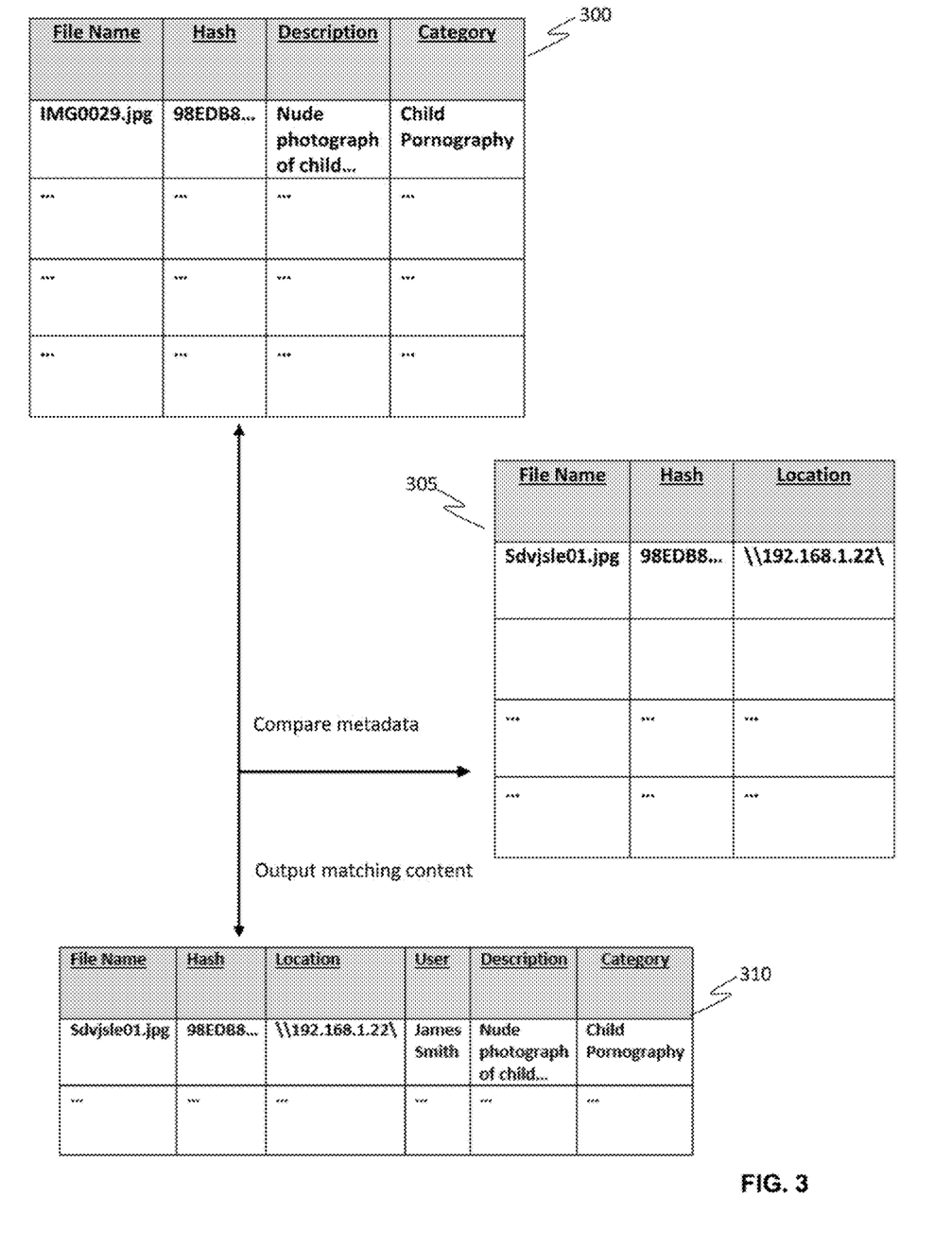
FIG. 3 depicts an exemplary database of known restricted content for comparison to metadata obtained by remote scanning of a remote computer system or network according to embodiments of the present invention.

With regard to FIG. 3, an exemplary database or list 300 of known metadata associated with known restricted content and a list 305 of metadata retrieved from a target computer system or network are depicted as stored in memory according to embodiments of the present invention. The list 300 of known metadata associated with known restricted content can include an MD5 hash value and other information associated with a specific file, such as a file name, a file description, a file category, file path, etc. The tables depicted in FIG. 3 may be data structures stored in computer memory and the layout and organization shown in FIG. 3 are exemplary.

The list 305 of metadata retrieved from a target computer system or network can include an MD5 hash value and other information associated with a specific file, such as a file name, a file location (e.g., file path) associated with the file. The file location can include a location of the respective computer system on the computer network (e.g., IP address) and/or a file path for locating the file. The metadata retrieved from a target computer system or network is compared to the list 300 of known metadata associated with known restricted content. If a hash of a file in list 305 matches a hash from the list 300 of known metadata associated with known restricted content, the target file is identified in an output record 310 as containing restricted content. In this way, restricted content can be efficiently identified without having to retrieve the entire content of the file system or physically handle or remove the hard drive in-person. Further, the restricted content itself is never scanned, transferred or copied or stored by the scanning tool.

Figure 4:
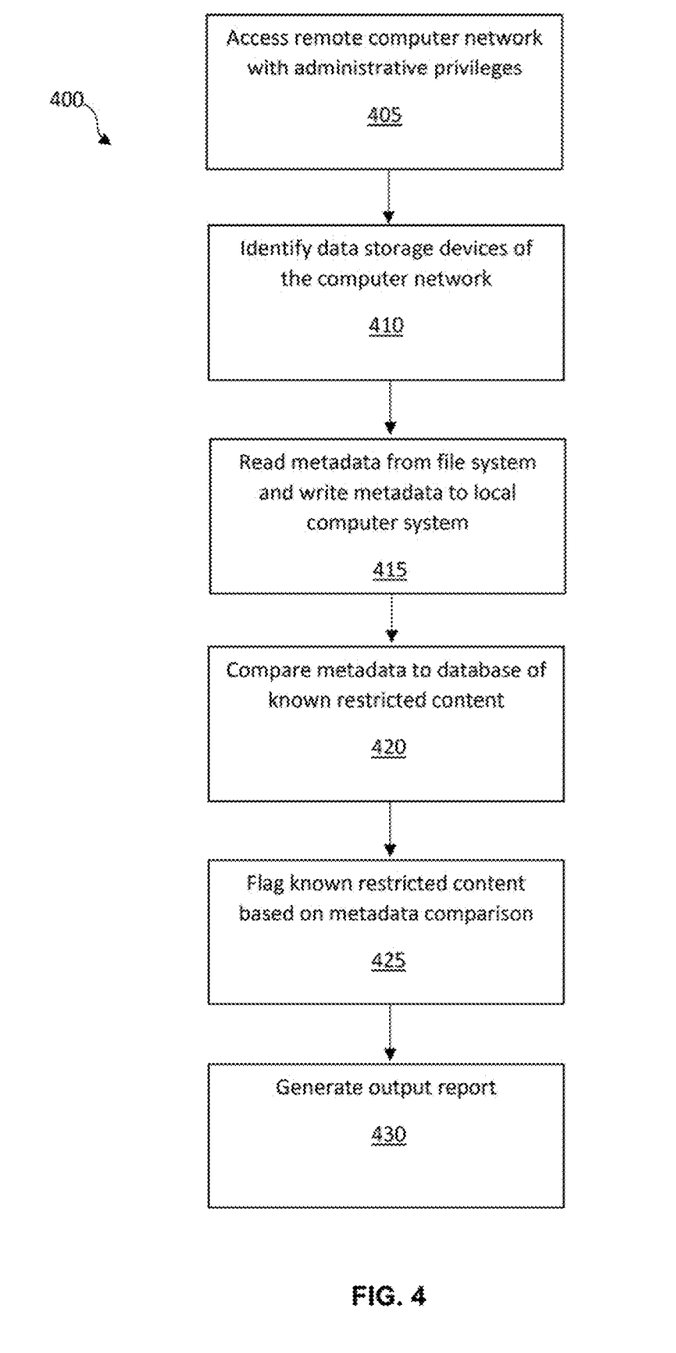
FIG. 4 depicts a flow chart of an exemplary sequence of computer implemented steps for performing remote file scanning to detect restricted content based on metadata according to embodiments of the present invention.

With regard to FIG. 4, a flowchart of an exemplary sequence of computer implemented steps 400 for remotely retrieving and scanning metadata of a remote computer system or network to identify restricted content therein is depicted according to embodiments of the present invention.

At step 405, a local computer system or server system accesses a remote computer system or network. This is typically performed at the request of (and with the permission of) the administrators of the remote network. In one embodiment, the administrators can sign up using a web-based application to use the scanning service. Information is then provided to the scanning service to identify the network to be scanned and to provide the required credentials to the scanning service to perform the scan. The local computer system or server system can then access the remote computer system or network using the administrative or superuser privileges, and the access can be performed over a VPN or other encrypted link. Such access, for instance, can be performed by a remote search server accessing the target network over the internet.

At step 410, data storage devices of the remote computer system or network are automatically identified by a remote server. Step 410 can include inputting or receiving a list of storage devices and associated locations and credentials required for accessing the storage devices. Step 410 can also include manually probing or scanning the network to identify the storage devices thereof. Step 410 can also identify files that are not accessible so that they can be made accessible in a subsequent scan.

At step 415, data is read from the remote computer system or network by the local computer system or server and stored locally at the local computer system. The data includes metadata associated with files stored by the remote computer system or network. The data does not include the actual file data itself, e.g., image files, for instance. The metadata can include MD5 hash values calculated by well-known algorithms that uniquely identify the files. Any hash algorithm can be used.

At step 420, the metadata read from the remote computer system or network is compared by the server system to a database or list of known metadata of restricted content. According to some embodiments of the present invention, a scanning application attempts to identify an MD5 hash value stored in metadata associated with a respective file that matches a known MD5 hash value stored in the database of known restricted content.

At step 425, when an MD5 hash value associated with a file matches an MD5 hash value stored in the database of known restricted content, the file associated with the MD5 hash value that is stored on the target client computer system is flagged as containing restricted content and its file path is logged and reported. Step 425 can also include identifying a user and/or location, or other information associated with the identified restricted content. The files that are scanned are also logged so that incremental subsequent scans can be performed to bypass these already scanned files.

At step 430, an output report is generated that describes the file or files flagged as containing restricted content based on the metadata comparison. The output report can include a file name, a file path, a user or computer system associated with a flagged file, and a description and/or category of the known bad content associated with the flagged file. Importantly, the file data itself, e.g., image data, is not scanned, not copied, not transferred and not stored.

According to some embodiments of the present invention, and as discussed above, a client registration process is performed before the client's remote computer system or network is accessed for scanning. The client can provide administrative or superuser credentials for accessing the remote computer system or network. The client can also provide a list of computers and devices on the client's computer network, or a mapping or description of the network topography for identifying devices to be scanned, and for identifying users associated with those devices.

According to some embodiments of the present invention, multiple scans are performed to read metadata from the remote computer system. After an initial scan, subsequent scans can be completed by scanning only content that is new or content that has been modified since the most recent scan. Any of a number of well known techniques can be employed by embodiments of the present invention to identify the new and/or modified files. In this way, subsequent scans can be performed more quickly and require less processing power and bandwidth usage.

According to some embodiments, the scanning tool described above with regard to embodiments of the present invention can identify problems with an ongoing scan, such as identifying data that is stored at the remote computer that is inaccessible to the scanning tool. For example, some files may be encrypted and require a key or password to access. In another example, a computer system may be powered off during a scan so that no data can be read from the computer system. The encrypted files or inaccessible computer systems can be identified by the scanning tool so that the issue can be corrected, for example, by unencrypting/unlocking the files or powering on the computer system.

According to some embodiments, scanning for restricted content includes scanning for duplicates of a file, for example, a file that is secret, sensitive, or confidential. The scanning tool can detect that a user has made an unauthorized copy of the file. Some embodiments of the present invention can identify a duplicate of a sensitive file according to metadata (e.g., a hash value) associated with the sensitive file, and the duplicate of the file is flagged.

According to some embodiments, the target hash value from the target network being scanned does not need to exactly match the known hash value from the database of known metadata of known restricted content. In other words, statistical algorithms can be used to identify a close, but not perfect or exact, match between the hash values. In these embodiments, files having close, but not exact matches, of the relevant metadata values are also logged and reported in the same way as exact hash value matches (as described above).

Exemplary Computer Controlled System

Embodiments of the present invention provide a method and system for remotely retrieving and scanning metadata in a computer system or computer network to identify known restricted content. The following discussion describes one such exemplary electronic system or computer system can be used as a platform for implementing embodiments of the present invention.

Figure 5:
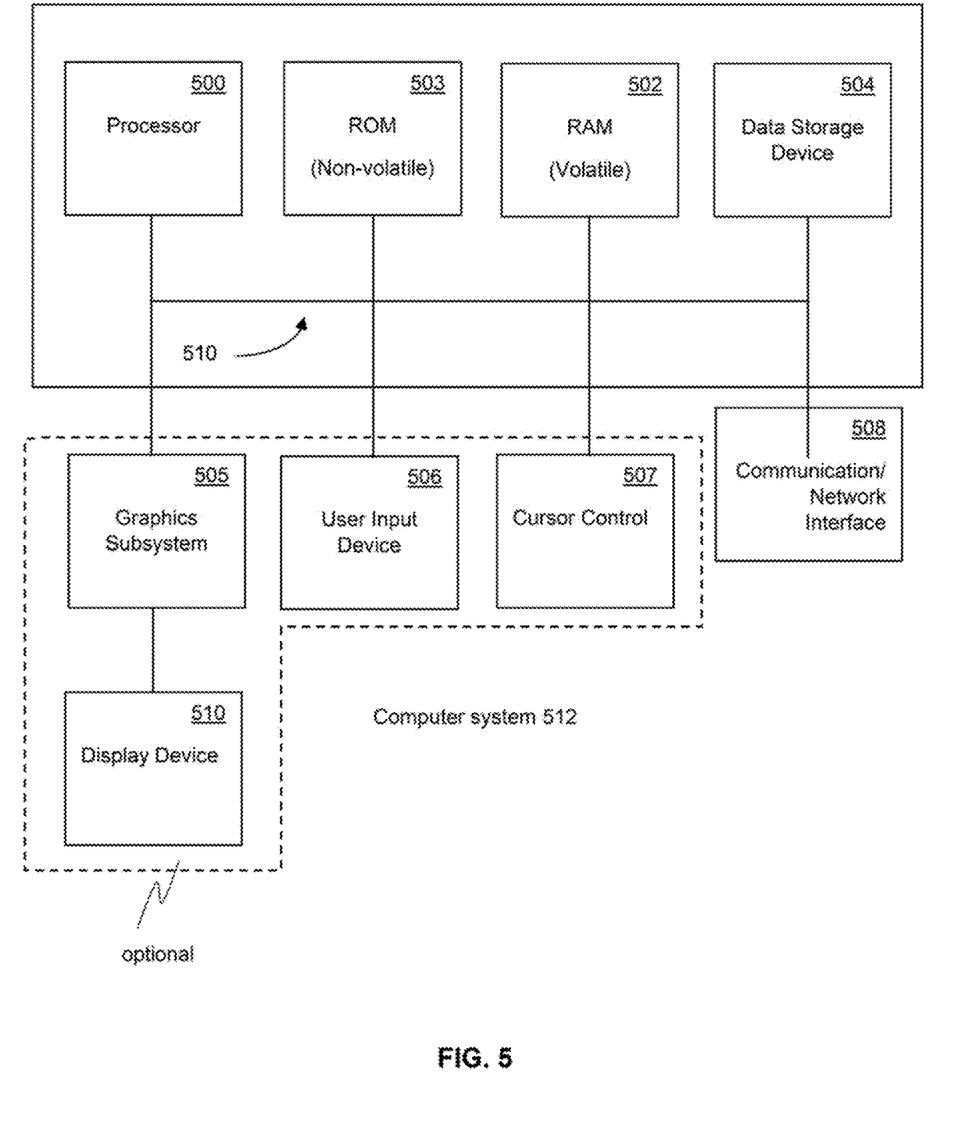
FIG. 5 is a block diagram depicting an exemplary computer system for performing remote file scanning to detect restricted content according to embodiments of the present invention.

In the example of FIG. 5, the exemplary computer system 512 includes a central processing unit (CPU) 501 for running software applications and optionally an operating system. System 512 can be the server that performs the scanning on the remote network. Random access memory 502 and read-only memory 503 store applications and data for use by the CPU 501. Data storage device 504 provides non-volatile storage for applications and data and may include network attached storage (NAS) devices, cloud storage devices, fixed disk drives, removable disk drives, flash memory devices, and CD-ROM, DVD-ROM or other optical storage devices. The data storage device 504 or the memory 502/503 can store a list of metadata or digests associated with known restricted content for identifying known restricted content on a remote computer system or network. The optional user inputs 506 and 507 comprise devices that communicate inputs from one or more users to the computer system 512 (e.g., mice, joysticks, cameras, touch screens, and/or microphones). A communication or network interface 508 allows the computer system 512 to communicate with other computer systems, networks, or devices via an electronic communications network, including wired and/or wireless communication and including an Intranet or the Internet. The network interface 508 can retrieve metadata associated with known restricted content and metadata associated with files stored by a remote computer system or network.

The optional display device 510 may be any device capable of displaying visual information, e.g., the final scan report, in response to a signal from the computer system 512 and may include a flat panel touch sensitive display, for example. The components of the computer system 512, including the CPU 501, memory 502/503, data storage 504, user input devices 506, and graphics subsystem 505 may be coupled via one or more data buses 500.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of automatically identifying restricted content on a computer system, said method comprising:
    accessing a remote computer network;
    identifying a storage device of said remote computer network;
    retrieving metadata from the storage device of said remote computer network, wherein the metadata comprises hash values associated with files stored on the storage device, wherein the retrieving metadata from the storage device of said remote computer network comprises retrieving only metadata from the storage device for files that have been added or modified since a previous scan;
    retrieving hash values associated with known restricted content from a remote database, wherein a hash value uniquely identifies a respective file and is based on a digest thereof;
    comparing said hash values associated with files stored on the storage device to said hash values associated with known restricted content; and
    flagging the respective file stored on the storage device and indicating a file identifier associated with said respective file when a hash value associated with said respective file substantially matches at least one of said hash values associated with known restricted content.

2. The method as described in claim 1, further comprising identifying a network location within said storage device associated with the hash value associated with said respective file.

3. The method as described in claim 1, further comprising identifying a user associated with the hash value associated with said respective file.

4. The method as described in claim 1, further comprising identifying a computer system associated with the hash value associated with said respective file.

5. The method as described in claim 1, wherein the hash values comprise an MD5 hash.

6. The method as described in claim 1, wherein the hash values comprise an SHA hash.

7. The method as described in claim 1, further comprising identifying computer systems of the remote computer network that are powered off.

8. The method as described in claim 1, further comprising identifying files of said computer network that are inaccessible.

9. The method as described in claim 1, further comprising flagging a hash value that represents a duplicate of a sensitive file.

10. A computer system for automatically and remotely identifying restricted content on a remote computer system, said computer system comprising:
- a memory for storing a list of known restricted content, said list comprising metadata that identifies said known restricted content; and
- a processor that executes instructions of a method to identify the restricted content, said method comprising:
- identifying a storage device of said remote computer network;
- retrieving metadata from the storage device of said remote computer network, wherein the metadata comprises hash values associated with files stored on the storage device, wherein the retrieving metadata from the storage device of said remote computer network comprises retrieving only metadata from the storage devices for the files that have been added or modified since a previous scan;
- retrieving hash values associated with known restricted content from a remote database, wherein a hash value uniquely identifies a respective file and is based on a digest thereof;
- comparing said hash values associated with files stored on the storage device to said hash values associated with known restricted content; and
- flagging the respective file stored on the storage device and indicating a file identifier associated with said respective file when a hash value associated with said respective file substantially matches at least one of said hash values associated with known restricted content.

11. The computer system as described in claim 10, wherein said method further comprises retrieving the hash values of known restricted content from a remote database of known restricted content, said database comprising metadata associated with the known restricted content.

12. The computer system as described in claim 10, wherein said method further comprises identifying a network location associated with the respective file.

13. The computer system as described in claim 10, wherein said method further comprises identifying a user associated with the respective file.

14. The computer system as described in claim 10, wherein said method further comprises identifying a computer system associated with the respective file.

15. The computer system as described in claim 10, wherein the hash values comprise an MD5 hash.

16. The computer system as described in claim 10, wherein the hash values comprise an SHA hash.

17. A non-transitory computer-readable storage medium having embedded therein program instructions, which when executed by one or more processors of a device, causes the device to execute a process that automatically identifies restricted content on a remote computer system, the process comprising:
- accessing a remote computer network;
- identifying a storage device of said remote computer network;
- retrieving metadata from the storage device of said remote computer network, wherein the metadata comprises hash values associated with files stored on the storage device, wherein the retrieving metadata from the storage device of said remote computer network comprises retrieving only metadata from the storage device for files that have been added or modified since a previous scan;
- retrieving hash values associated with known restricted content from a remote database, wherein a hash value uniquely identifies a respective file and is based on a digest thereof;
- comparing said hash values associated with files stored on the storage device to said hash values associated with known restricted content; and
- flagging the respective file stored on the storage device and indicating a file identifier associated with said respective file when a hash value associated with said respective file substantially matches at least one of said hash values associated with known restricted content.

* * * * *